United States Patent
Walker et al.

(10) Patent No.: US 7,160,618 B2
(45) Date of Patent: Jan. 9, 2007

(54) ANTIOXIDANT SYSTEM FOR CARBON—CARBON BRAKE MATERIALS WITH ENHANCED RESISTANCE TO HUMIDITY EXPOSURE

(75) Inventors: Terence B. Walker, South Bend, IN (US); Manuel G. Koucouthakis, Granger, IN (US); Michelle L. Shreve, South Bend, IN (US); Laurie A. Booker, South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 280 days.

(21) Appl. No.: 10/885,303

(22) Filed: Jul. 6, 2004

(65) Prior Publication Data

US 2006/0008647 A1    Jan. 12, 2006

(51) Int. Cl.
*B32B 9/00* (2006.01)

(52) U.S. Cl. .................... 428/408; 427/249.2
(58) Field of Classification Search ................ 428/408, 428/367; 427/424, 228, 698
See application file for complete search history.

(56) References Cited

U.S. PATENT DOCUMENTS

| | | | |
|---|---|---|---|
| 2,995,453 A | 8/1961 | Noble et al. |
| 3,655,690 A | 4/1972 | Evans |
| 3,724,613 A | 4/1973 | Bermingham |
| 3,967,037 A | 6/1976 | Marzocchi et al. |
| 4,045,608 A | 8/1977 | Todd |
| 4,197,223 A | 4/1980 | Bartram |
| 4,329,177 A | 5/1982 | George |
| 4,391,642 A | 7/1983 | Stevenson et al. |
| 4,504,314 A | 3/1985 | Barker et al. |
| 5,482,742 A | 1/1996 | Takamiya et al. |
| 5,725,077 A | 3/1998 | Taylor et al. |
| 6,455,159 B1 | 9/2002 | Walker et al. |
| 6,737,120 B1 | 5/2004 | Golecki |
| 2004/0038032 A1 | 2/2004 | Walker et al. |
| 2004/0038043 A1 | 2/2004 | Golecki et al. |

*Primary Examiner*—John J. Zimmerman
*Assistant Examiner*—Daniel Miller
(74) *Attorney, Agent, or Firm*—Birch, Stewart, Kolasch & Birch, LLP

(57) ABSTRACT

Method of improving humidity resistance in a coated article (19) comprising a carbon-carbon composite component (10), a graphite component (10), or a ceramic matrix composite component based on carbon fibers and/or graphite (10). The component (10) is preferably configured as an aircraft landing system brake disc. The method includes the steps of: (A) providing a carbon-carbon composite component (10), a graphite component (10), or a ceramic matrix composite component based on carbon fibers and/or graphite (10); (B) covering the component (10) with a phosphorus-containing antioxidant undercoating (11) having a thickness of approximately 1–10 mil; and (C) covering the resulting undercoated component (10, 11) with a boron-containing glass overcoating (12) having a thickness of approximately 1–10 mil. The overcoating includes 20–50 wt-% alkali or alkaline earth metal silicates, 3–25 wt-% alkali metal hydroxide, up to 10 wt-% boron nitride, and one or both of 5–40 wt-% elemental boron and 5–40 wt-% boron carbide. The overcoating is substantially free of phosphoric acid and phosphates. Also, articles coated with the specified undercoating/overcoating combinations.

12 Claims, 1 Drawing Sheet

ANTIOXIDANT SYSTEM FOR CARBON—CARBON BRAKE MATERIALS WITH ENHANCED RESISTANCE TO HUMIDITY EXPOSURE

FIELD OF THE INVENTION

This invention relates to novel oxidation-resistant coating systems for carbon-carbon composites and other carbon materials, such as graphite, and to methods for the preparation of the oxidatively protected composites. This invention is of particular utility in the field of aircraft braking systems.

BACKGROUND OF THE INVENTION

Carbon fiber or C—C composites which are useful for instance in airplane braking systems are subject to oxidation and resultant weight loss (that is, loss of mass). Oxidative weight loss of such carbon composites is generally retarded by coating articles made of the carbon composites with an antioxidant coating.

U.S. Pat. No. 6,737,120 B1 relates to carbon fiber or C—C composites that are useful in a variety of applications. This patent teaches methods of protecting such composites against oxidation by coating them with fluidized-glass type mixtures. The fluidized-glass mixtures are maintained as liquid precursors and are applied to components formed of carbon fiber or C—C composites. Once coated with the precursors, the coated C—C components are heat-treated or annealed for one or more cycles through a series of gradual heating and cooling steps. This creates glass coatings having thicknesses of about 1–10 mils. The thicknesses of the glass coatings may be varied by varying the composition of the fluidized glass precursor mixtures, the number of application cycles, and/or the annealing parameters.

U.S. Pat. No. 6,737,120 teaches that the fluidized glass materials may comprise such materials as borate glasses (boron oxides), phosphate glasses (phosphorus oxides), silicate glasses (silicon oxides), and plumbate glasses (lead oxides). These glasses may include phosphates of manganese, nickel, vanadium, aluminum, and zinc, and/or alkaline and alkaline earth metals such as lithium, sodium, potassium, rubidium, magnesium, and calcium and their oxides, and elemental boron and/or boron compounds such as BN, $B_4C$, $B_2O_3$, and $H_3BO_3$. By way of example, U.S. Pat. No. 6,737,120 discloses a boron-containing liquid fluidized glass precursor mixture that includes 29 weight-% phosphoric acid, 2 weight-% manganese phosphate, 3 weight-% potassium hydroxide, 1 weight-% boron nitride, 10 weight-% boron, and 55 weight-% water.

U.S. Pat. No. 6,455,159 B1 likewise relates to carbon-carbon composites and graphitic materials. U.S. Pat. No. 6,455,159 has as objectives the protection of carbon/carbon composites or graphites at elevated temperatures up to and exceeding 850° C. and the reduction of catalytic oxidation at normal operating temperatures. U.S. Pat. No. 6,455,159 achieves these objectives by employing a penetrant salt solution which contains ions formed from 10–80 wt-% $H_2O$, 20–70 wt-% $H_3PO_4$, 0.1–25 wt-% alkali metal mono-, di-, or tri-basic phosphate, and up to 2 wt-% $B_2O_3$. Their penetrant salt solutions also include at least one of $MnHPO_4.1.6H_2O$, $AlPO_4$, and $Zn_3(PO_4)_2$, in weight-percentages up to 25 wt-%, 30 wt-%, and 10 wt-%, respectively.

Application Ser. No. 10/223,946, filed Aug. 20, 2002 (H0003342), discloses a coated article protected against catalytic oxidation when the article is subjected to temperatures of 800° C. or greater. The article comprises a component made of carbon fiber or carbon-carbon composite annealed at a temperature in the range of 1600–2600° C. This component is covered by a phosphorus-containing undercoating comprising ions formed from 10–80 wt-% $H_2O$, 20–70 wt-% $H_3PO_4$, 0.1–25 wt-% alkali metal mono-, di-, or tri-basic phosphate, 0–2 wt-% $B_2O_3$, and 0–25 wt-% $MnHPO_4.1.6H_2O$, 0–30 wt-% $AlPO_4$, and 0–10 wt-% $Zn_3(PO_4)_2$, provided that at least one of $AlPO_4$, $MnHPO_4.1.6H_2O$, and $Zn_3(PO_4)_2$ is present. The undercoating is covered by a boron-containing glass overcoating. The coating systems of Ser. No. 10/223,946 provide a high level of oxidation protection simultaneously in both high temperature and catalyzed oxidation conditions. However, these coating systems may become somewhat "muddy" in appearance after long-term humidity exposure. This may make them unsatisfactory for field use.

Silicate binder compositions have long been well known. See for instance U.S. Pat. Nos. 4,504,314; 4,391,642; 4,329,177 and 2,995,453. However, silicate binders have not previously been used in the context in which they are employed in the present invention.

The coating systems described above provide significant antioxidant protection for carbon composites. However, there remains a need for antioxidant coating systems that provide improved humidity resistance.

SUMMARY OF THE INVENTION

This invention provides a coated article comprising a carbon-carbon composite component, a graphite component, or a ceramic matrix composite component based on carbon fibers and/or graphite. In a preferred embodiment, the component is an aircraft landing system brake disc. In accordance with the present invention, that component is covered by an undercoating, which in turn is covered by an overcoating.

One embodiment of this invention is a coated article. The starting point of the coated article may be a carbon-carbon composite component, a graphite component, or a ceramic matrix composite component based on carbon fibers and/or graphite. In a preferred aspect of this embodiment, the component is configured as an aircraft landing system brake disc. This component is covered by a phosphorus-containing undercoating having a thickness of approximately 1–10 mil.

The undercoating in this invention is a phosphorus-containing antioxidant coating. This undercoating may be made from a penetrant solution that includes 5–80 wt-% $H_2O$, 10–70 wt-% $H_3PO_4$, up to 25 wt-% alkali metal mono-, di-, or tri-basic phosphate, up to 2 wt-% $B_2O_3$, and up to 25 wt-% $MnHPO_4.1.6H_2O$, up to 80 wt-% $AlPO_4$, and up to 10 wt-% $Zn_3(PO_4)_2$, provided that at least one of $AlPO_4$, $MnHPO_4.1.6H_2O$, and $Zn_3(PO_4)_2$ is present.

In accordance with the present invention, the undercoated component is covered by a boron-containing glass overcoating having a thickness of approximately 1–10 mil.

The overcoating of this invention comprises, on a solids basis, 20–50 wt-% (preferably 35–50 wt-%) alkali or alkaline earth metal silicate, 3–25 wt-% (preferably 4–20 wt-%) alkali metal hydroxide, up to 10 wt-% (preferably 1–6 wt-%) boron nitride, and one or both of 5–40 wt-% elemental boron and 5–40 wt-% boron carbide (preferably 25–40 wt-% elemental boron). In accordance with the present invention, this boron-containing glass overcoating is substantially free of phosphoric acid and phosphates.

In a particularly preferred embodiment of the article aspect of this invention, the boron-containing glass overcoating comprises 40 wt-% alkali metal silicate, 19 wt-% alkali metal hydroxide, 3 wt-% boron nitride, and 38 wt-% elemental boron.

Another embodiment of the present invention is a method of improving humidity resistance in a coated article. The coated article may involve a carbon-carbon composite component, a graphite component, or a ceramic matrix composite component based on carbon fibers and/or graphite, and will most preferably be an aircraft landing system brake disc. This method includes covering the component with a phosphorus-containing undercoating having a thickness of approximately 1–10 mil, the undercoating comprising 5–80 wt-% $H_2O$, 10–70 wt-% $H_3PO_4$, up to 25 wt-% alkali metal mono-, di-, or tri-basic phosphate, up to 2 wt-% $B_2O_3$, and up to 25 wt-% $MnHPO_4.1.6H_2O$, up to 80 wt-% $AlPO_4$, and up to 10 wt-% $Zn_3(PO_4)_2$, provided that at least one of $AlPO_4$, $MnHPO_4.1.6H_2O$, and $Zn_3(PO_4)_2$ is present, and then covering the resulting undercoated component with a boron-containing glass overcoating having a thickness of approximately 1–10 mil, said overcoating comprising 20–50 wt-% alkali or alkaline earth metal silicates, 3–25 wt-% alkali metal hydroxide, up to 10 wt-% boron nitride, and one or both of 5–40 wt-% elemental boron and 5–40 wt-% boron carbide, it being understood that the boron-containing glass overcoating is substantially free of phosphoric acid and phosphates. In this method, the undercoating may annealed to the carbon composite at a temperature of 250–900° C., and the glass overcoating may be dried onto the undercoating at ambient temperature for at least an hour.

DETAILED DESCRIPTION OF THE INVENTION

Figure 1:
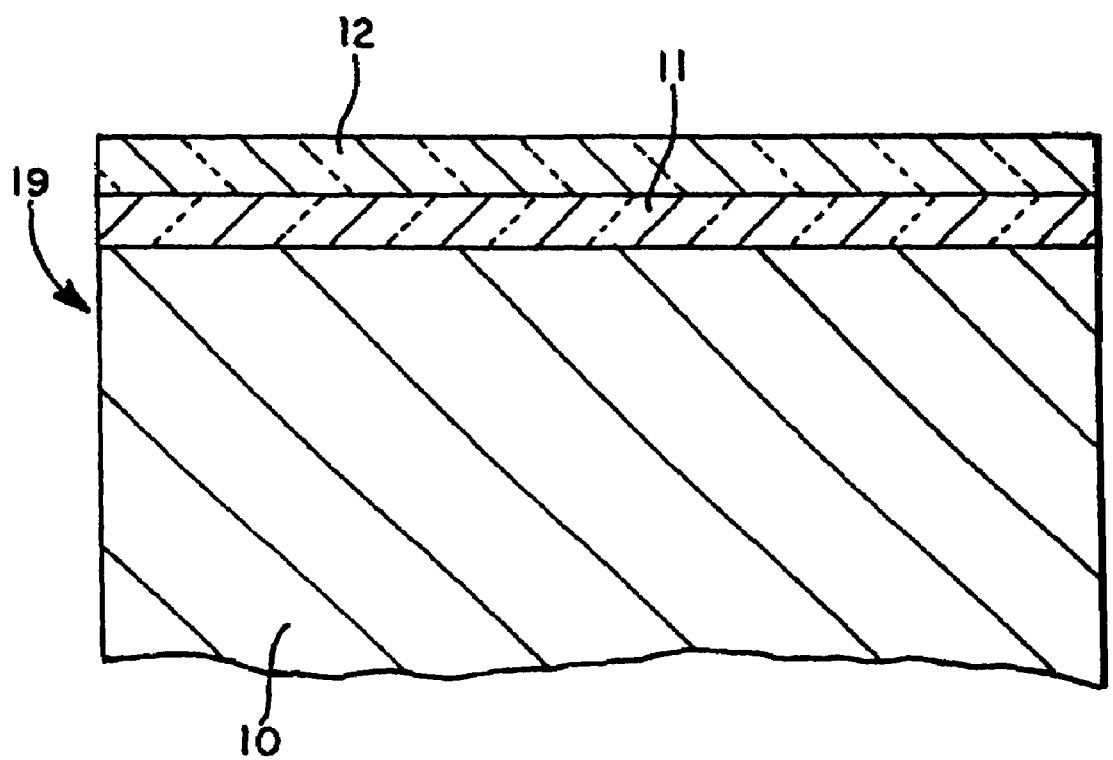
FIG. 1 is a schematic view of a carbon fiber or C—C substrate having a coating system formed in accordance with the present invention.

The present invention is embodied by a carbon fiber or C—C composite component that is coated with a two-layer anti-oxidant system. For a better understanding of this invention, attention is directed to FIG. 1, wherein a coated carbon fiber or C—C article component is generally illustrated at 19. A component 10 is covered by a protective undercoating 11 (phosphorus-containing glass) and the undercoating 11 is covered by a protective overcoating 12 (glass containing boron, silicate, and hydroxide).

Component 10

Before the first fluidized glass formulation is applied to the C—C composite component, the component may be fabricated into almost any desired shape. The present invention is particularly valuable with the C—C composite component is an aircraft landing system brake disc.

Carbon-carbon composites are generally prepared from carbon preforms. Carbon preforms are made of carbon fibers, formed for instance from fibers of pre-oxidized polyacrylonitrile (PAN). These fibers can be layered together to form shapes, such as friction brake discs, which shapes are then heated and infiltrated with methane or another pyrolyzable carbon source to form the C—C composite preforms. Carbon-carbon composites useful in accordance with the present invention typically have densities in the range of from about 1.6 $g/cm^3$ through 2.0 $g/cm^3$. Methods of manufacturing C—C composites are generally well known to those skilled in the art.

For purposes of illustration only, the C—C composite component 10 may be fabricated from woven fabric panes of pitch-based Amoco P30X carbon fiber tows in a harness satin weave or from a pitch-based Nippon XNC25 in a plain weave. The tows are rigidized with a few weight-% carbon-containing resin, such as epoxy Novolac. The material is then carbonized at a temperature in the range of 800–1000° C. and densified by carbon CVD. The resulting materials is then annealed in an inert gas at a temperature in the range of 1600–2600° C. This process creates a C—C composite component that is adaptable for use in high temperature environments when it is properly protected against oxidation. It is understood that the oxidation protective coating system of the present invention is applicable to C—C composite components regardless of how the C—C composite components are fabricated.

Undercoating 11

The C—C component 10 is immersed or dipped in a liquid penetrant solution for several minutes. Preferred precursors for use in applying the undercoating layer in accordance with the present invention are phosphoric acid-based penetrant salt solutions, which are described in detail in U.S. Pat. No. 6,455,159, the entire disclosure of which is hereby expressly incorporated by reference. A typical penetrant salt solution that can be used to form the undercoating herein could contain from 5–80 wt % $H_2O$, 10–70 wt % $H_3PO_4$, up to 25 wt % alkali metal mono-, di-, or tri-basic phosphate, and up to 2 wt % $B_2O_3$. The typical penetrant salt solution will also include at least one of $MnHPO_4.1.6H_2O$, $AlPO_4$, and $Zn_3(PO_4)_2$, in weight-percentages up to 25 wt-%, 30 wt-%, and 10 wt-%, respectively.

In accordance with this invention, the surface of the carbon-carbon composite or graphitic material is treated with the penetrant solution by painting, dipping, or other conventional application techniques. Subsequently the surface-treated material is cured at a temperature in the range of 250–900° C. Typically, the surface is treated with one to three coats of the penetrant solution, and the peak temperature is generally held for one to six hours.

Overcoating 12

The composite component 10 bearing the undercoating 11 is immersed or bathed in a fluidized glass precursor to cover the undercoated component with an overcoating 12. In accordance with this invention, the overcoating 12 will comprise 20–50 wt-% alkali or alkaline earth metal silicates, 3–20 wt-% alkali metal hydroxide, up to 10 wt-% boron nitride, and one or both of 5–40 wt-% elemental boron and 5–40 wt-% boron carbide. In addition, in this invention, the glass overcoating 12 will be substantially free of phosphoric acid and phosphates. The terminology "substantially free" in this context means that the overcoating does not depend for its antioxidant effect on the presence of phosphoric acid or phosphate in the composition.

The C—C component 10 with its solid glass undercoating 11 is immersed or dipped in a liquid bath precursor of fluidized boron-containing glass for several minutes. The liquid precursor is maintained at a temperature in the range of approximately 20–90° C. The component 10 may be rotated relative to the liquid precursor to improve the wetting characteristics and uniformity of the coating.

The fluidized boron-silicate-hydroxide-containing glass coating is converted to a solid glass coating 12 completely coating and forming—with solid glass coating 11—a protective barrier against undesirable oxidation of C—C component 10. In other words, at this stage, the composite component 10 is permanently coated with a fluidized glass protective coating system (11, 12). The coating system (11, 12) comprises glass materials that are capable of at least some flowing with at least partial sealing of any pre-existing cracks that may be present in the C—C component.

Variability

The properties of the glass materials 11 and 12 may be tailored to the temperature range over which and/or oxidation catalysts to which coating system (11, 12) is designed to protect the composite component 10 from destructive oxidation. Likewise, the thicknesses of and numbers of glass coatings applied to component 10 will depend on the method of applying the coating and the intended use for the coated article 19. If the coated article will be subjected to sustained or repeated high temperatures, a number of separate sub-layers may be applied to make up undercoating 11 and/or overcoating 12. This antioxidant coating system may be used on a wide variety of carbon fiber or carbon-carbon composite articles, including but not limited to aircraft landing system brake discs.

Humidity Resistance

The present invention provides carbon-carbon brake materials and the like having enhanced moisture resistance, due to their use of silicate-containing binders in boron-based overcoatings.

Overcoating formulations were prepared having the following components (weights in grams). In all cases hereinbelow, the Binder employed was Cerama-Bind 830 binder solution, and KOH refers to potassium hydroxide. Cerama-Bind 830 is a silicate binder solution that is available from Aremco Products, Inc. of Valley Cottage, N.Y. Cerama-Bind 830 has a pH of 11.4 and a solids content of 25 weight-%.

| Ingredients | #1* | #2* | #3* | #4 |
|---|---|---|---|---|
| Boron | 10 | 10 | 10 | 10 |
| Boron nitride | | | | |
| Binder | 40 | 40 | 40 | 40 |
| KOH | | 0.1 | 1 | 5 |
| Distilled H$_2$O | | | | |

| Ingredients | #5 | #6* | #7* | #8* |
|---|---|---|---|---|
| Boron | 10 | 10 | 10 | 10 |
| Boron nitride | | 0.92 | 0.92 | 0.92 |
| Binder | 40 | 40 | 40 | 40 |
| KOH | 10 | | 0.1 | 1 |
| Distilled H$_2$O | | | | |

| Ingredients | #9 | #10 | #11* | #12 |
|---|---|---|---|---|
| Boron | 10 | 10 | 10 | 10 |
| Boron nitride | 0.92 | 0.92 | | |
| Binder | 40 | 40 | 40 | 40 |
| KOH | 5 | 10 | 1.5 | 2 |
| Distilled H$_2$O | | | | |

| Ingredients | #13 | #14 | #15* | #16 |
|---|---|---|---|---|
| Boron | 10 | 10 | 10 | 10 |
| Boron nitride | | | 0.92 | 0.92 |
| Binder | 40 | 40 | 40 | 40 |
| KOH | 3 | 4 | 1.5 | 2 |
| Distilled H$_2$O | | | | |

| Ingredients | #17 | #18 | #9A* | #21 |
|---|---|---|---|---|
| Boron | 10 | 10 | 10 | 10 |
| Boron nitride | 0.92 | 0.92 | 0.92 | 0.92 |
| Binder | 40 | 40 | 25 | 40 |
| KOH | 3 | 4 | | 4 |
| Distilled H$_2$O | | | 10 | 10 |

*These formulations, all of which contain less than 3 weight-% potassium hydroxide, do not comprise part of the present invention. These formulations are included herein for comparative purposes.

Each of the above formulations was applied as an overcoating over a carbon-carbon composite that had previously been coated with a phosphorus-based anti-oxidant undercoating.

Each of the above formulations, coated as indicated on a C—C composite, was tested in a visibility test. The visibility test investigated the anti-oxidant overcoating's ability to resist a "mud cracking" effect which was observed with some of the formulations during the curing or drying process. The rating of "good" indicates that no mud cracking was observed when the specimen was examined under an optical microscope. The rating of "bad" indicates that cracks were observed when the specimen was examined under an optical microscope.

| | #1* | #2* | #3* | #4 |
|---|---|---|---|---|
| Visibility rating | Bad | Bad | Bad | Good |
| | #5 | #6* | #7* | #8* |
| Visibility rating | Good | Bad | Bad | Bad |
| | #9 | #10 | #11* | #12 |
| Visibility rating | Good | Good | Bad | Bad |
| | #13 | #14 | #15* | #16 |
| Visibility rating | Bad | Good | Good | Bad |
| | #17 | #18 | #9A* | #21 |
| Visibility rating | Good | Good | Bad | Good |

As can be seen in the above report, the novel formulations of the present invention generally provided "good" results and the control formulations generally provided "bad" results. While some compositions of the present invention (#12, #13) did not provide optimum visibility results in the "mud cracking" test, as will be seen from data presented below, their performance in terms of oxidation and humidity resistance were still quite good.

Some of the above formulations, coated as indicated above on a C—C composite, were tested in a humidity resistance test. The humidity resistance test investigated the anti-oxidant overcoating's ability to resist smudging when a surface coated with the antioxidant overcoating was swiped with a finger or a cloth. The tests were performed on coated carbon-carbon composite segments that had been kept in a humidity chamber (95% humidity, 84° F.) for 10 days. The following rating system was used in evaluating the resistance to humidity displayed by the overcoating formulation:

| | #1* | #2* | #3* | #4 |
|---|---|---|---|---|
| Humidity rating | Not tested | Not tested | Not tested | 2 |
| | #5 | #6* | #7* | #8* |
| Humidity rating | 1 | Not tested | Not tested | Not tested |
| | #9 | #10 | #11* | #12 |
| Humidity rating | 2 | 1 | 1 | 3 |

-continued

|  | #13 | #14 | #15* | #16 |
|---|---|---|---|---|
| Humidity rating | 3 | 2 | 1 | 2 |

|  | #17 | #18 | #9A* | #21 |
|---|---|---|---|---|
| Humidity rating | 3 | 3 | 1 | 2 |

"1" = poor resistance; smudged when swiped with finger or cloth;
"2" = good resistance; very little material observed on finger or cloth after swiping;
"3" = excellent resistance; no smudging.

As can be seen in the above report, the novel formulations of the present invention generally provided good or excellent results and the control formulations generally provided poor results.

Oxidative Weight Loss

Formulations #17 and #18 of this invention were used as overcoatings on carbon-carbon composites having phosphorus-based anti-oxidant undercoatings. The undercoatings used in these examples, referred to below as P13K(−50) and P39, were antioxidant compositions containing phosphoric acid and phosphates. P13K(−50) is 51.27 wt-% phosphoric acid (85% solution in water), 14.17 wt-% monoluminum phosphate (50% solution in water), 12.41 wt-% distilled water, 3.56 wt-% zinc phosphate, 2.96 wt-% manganese phosphate, 1.63 wt-% boric acid, and 12.23 wt-% potassium dihydrogen phosphate. P39 is 11.08 wt-% phosphoric acid (85% solution in water), 66.76 wt-% monoaluminum phosphate (50% solution in water), 8.08 wt-% distilled water, 2.58 wt-% manganese phoshate, 0.8 wt-% boric anhydride, and 10.7 wt-% potassium dihydrogen phosphate. The overcoated C—C composites were tested for oxidative weight loss, by heating at 1600° F. in air flowing at a rate of 3 cubic feet per hour over a period of 6 hours, with the following results.

|  | Undercoat/ Overcoat | Weight as manufactured (grams) | Weight after oxidation (grams) | Weight loss (percent) |
|---|---|---|---|---|
| 1 | P13K(−50)/ #17 | 20.8836 | 20.7704 | 0.54 |
| 2 | P13K(−50)/ #17 | 20.8139 | 20.8183 | (0.02) |
| 3 | P13K(−50)/ #17 | 20.9163 | 20.8681 | 0.23 |
| 4 | P13K(−50)/ #17 | 20.6344 | 20.6384 | (0.02) |
| 5 | P13K(−50)/ #17 | 20.6322 | 20.6519 | (0.10) |
| 6 | P13K(−50)/ #17 | 20.7957 | 20.7721 | 0.11 |
| 7 | P13K(−50)/ #17 | 20.7137 | 20.7391 | (0.12) |
| 8 | P13K(−50)/ #17 | 20.8348 | 20.8778 | (0.21) |
| 9 | P13K(−50)/ #17 | 20.7272 | 20.7354 | (0.04) |
| 10 | P13K(−50)/ #17 | 20.9431 | 20.9645 | (0.10) |
| Average |  | 20.7895 | 20.7836 | 0.03 |
| 1 | P13K(−50)/ #18 | 20.6496 | 20.6600 | (0.05) |
| 2 | P13K(−50)/ #18 | 20.7909 | 20.7827 | 0.04 |
| 3 | P13K(−50)/ #18 | 20.8758 | 20.7591 | 0.56 |
| 4 | P13K(−50)/ #18 | 20.6188 | 20.4855 | 0.65 |
| 5 | P13K(−50)/ #18 | 20.7341 | 20.6790 | 0.27 |
| 6 | P13K(−50)/ #18 | 20.9985 | 20.9661 | 0.15 |
| 7 | P13K(−50)/ #18 | 21.1190 | 20.1359 | (0.08) |
| 8 | P13K(−50)/ #18 | 20.9577 | 20.9162 | 0.20 |
| 9 | P13K(−50)/ #18 | 20.9008 | 20.8573 | 0.21 |
| 10 | P13K(−50)/ #18 | 20.8276 | 20.7877 | 0.19 |
| Average |  | 20.8473 | 20.8030 | 0.21 |
| 1 | P39/ #17 | 20.4855 | 20.5097 | (0.12) |
| 2 | P39/ #17 | 20.7300 | 20.7624 | (0.16) |
| 3 | P39/ #17 | 20.4841 | 20.5239 | (0.19) |
| 4 | P39/ #17 | 20.7053 | 20.7072 | (0.01) |
| 5 | P39/ #17 | 20.5505 | 20.3700 | 0.88 |
| 6 | P39/ #17 | 20.6222 | 20.6225 | 0.00 |
| 7 | P39/ #17 | 20.4038 | 20.4353 | (0.15) |
| 8 | P39/ #17 | 20.5815 | 20.6121 | (0.15) |
| 9 | P39/ #17 | 20.9072 | 20.9412 | (0.16) |
| 10 | P39/ #17 | 20.6681 | 20.6855 | (0.08) |
| Average |  | 20.6138 | 20.6170 | (0.02) |
| 1 | P39/ #18 | 20.1782 | 20.2095 | (0.16) |
| 2 | P39/ #18 | 19.9074 | 19.9499 | (0.21) |
| 3 | P39/ #18 | 20.5795 | 20.6127 | (0.16) |
| 4 | P39/ #18 | 20.7570 | 20.7383 | 0.09 |
| 5 | P39/ #18 | 20.5825 | 20.5433 | 0.19 |
| 6 | P39/ #18 | 20.3384 | 20.3767 | (0.19) |
| 7 | P39/ #18 | 21.7465 | 20.7617 | (0.07) |
| 8 | P39/ #18 | 20.8360 | 20.8698 | (0.16) |
| 9 | P39/ #18 | 20.5003 | 20.5141 | (0.07) |
| 10 | P39/ #18 | 20.5862 | 20.6089 | (0.11) |
| Average |  | 20.5012 | 20.5185 | (0.09) |

It should be noted that many of the "weight loss" figures are reported hereinabove as negative. In those cases, the coated C—C composite actually gained weight during the oxidation test.

A catalytic oxidation resistance test was performed using the P13K(−50) undercoat and the formulation #6 overcoat, under the following conditions. Coated specimens were soaked in a potassium acetate solution for 30 minutes and then dried at 80° C. for a minimum of 8 hours. They were then oxidized for 24 hours at 1200° F. at an air flow rate of 3 SCFH. The following results were obtained:

| | Undercoat/ Overcoat | Weight as manufactured (grams) | Weight after oxidation (grams) | Weight loss (percent) |
|---|---|---|---|---|
| 1 | P13K(−50)/ #6 | 20.7734 | 20.5908 | 0.88 |
| 2 | P13K(−50)/ #6 | 20.7286 | 20.4931 | 1.14 |
| 3 | P13K(−50)/ #6 | 20.7386 | 20.6312 | 0.49 |
| 4 | P13K(−50)/ #6 | 20.6880 | 21.5420 | 0.71 |
| 5 | P13K(−50)/ #6 | 21.2424 | 21.2164 | 0.12 |
| 6 | P13K(−50)/ #6 | 21.0690 | 21.0095 | 0.28 |
| 7 | P13K(−50)/ #6 | 20.7900 | 20.7256 | 0.31 |
| 8 | P13K(−50)/ #6 | 21.1210 | 21.0918 | 0.14 |
| 9 | P13K(−50)/ #6 | 20.9741 | 20.9204 | 0.26 |
| 10 | P13K(−50)/ #6 | 21.0940 | 20.8233 | 1.28 |
| Average | | 20.9213 | 20.8044 | 0.56 |

The above results provide evidence that the coating formulations of this invention can be used without engendering excessive weight loss upon oxidation (and that in some cases composites coated with formulations of this invention may actually gain weight upon oxidation).

What is claimed is:

1. A coated article comprising a carbon-carbon composite component, a graphite component, or a ceramic matrix composite component based on carbon fibers and/or graphite, said component being covered by a phosphorus-containing antioxidant undercoating having a thickness of approximately 1–10 mil, said undercoating being covered by a boron-containing glass overcoating having a thickness of approximately 1–10 mil, said overcoating comprising 20–50 wt-% alkali or alkaline earth metal silicate, 3–25 wt-% alkali metal hydroxide, up to 10 wt-% boron nitride, and one or both of 5–40 wt-% elemental boron and 5–40 wt-% boron carbide, said boron-containing glass overcoating being substantially free of phosphoric acid and phosphates.

2. The article of claim 1, configured as an aircraft landing system brake disc.

3. The article of claim 1, wherein said boron-containing glass overcoating comprises 35–50 wt-% alkali metal silicate, 4–20 wt-% alkali metal hydroxide, 1–6 wt-% boron nitride, and 25–40 wt-% elemental boron.

4. The article of claim 1, wherein said boron-containing glass overcoating comprises, on a solids basis, 40 wt-% alkali metal silicate, 19 wt-% alkali metal hydroxide, 3 wt-% boron nitride, and 38 wt-% elemental boron.

5. The article of claim 1, wherein said phosphorus-containing antioxidant undercoating is formed from a penetrant salt solution containing from 5–80 wt % $H_2O$, 10–70 wt % $H_3PO_4$, up to 25 wt % alkali metal mono-, di-, or tri-basic phosphate, up to 2 wt % $B_2O_3$, and at least one of $MnHPO_4 \cdot 1.6H_2O$, $AlPO_4$, and $Zn_3(PO_4)_2$, in weight-percentages up to 25 wt-%, 30 wt-%, and 10 wt-%, respectively.

6. The article of claim 1, wherein the undercoating is annealed to the carbon composite at a temperature in the range of 250–900° C.

7. The article of claim 1, wherein the glass overcoating is dried onto the undercoating at ambient temperature for at least one hour.

8. A method of improving humidity resistance in a coated article comprising a carbon-carbon composite component, a graphite component, or a ceramic matrix composite component based on carbon fibers and/or graphite, said method comprising the steps of:

(a) providing a carbon-carbon composite component, a graphite component, or a ceramic matrix composite component based on carbon fibers and/or graphite;

(b) covering said component with a phosphorus-containing antioxidant undercoating having a thickness of approximately 1–10 mil; and (c) covering the resulting undercoated component with a boron-containing glass overcoating having a thickness of approximately 1–10 mil, said overcoating comprising 20–50 wt-% alkali or alkaline earth metal silicates, 3–25 wt-% alkali metal hydroxide, up to 10 wt-% boron nitride, and one or both of 5–40 wt-% elemental boron and 5–40 wt-% boron carbide, said boron-containing glass overcoating being substantially free of phosphoric acid and phosphates.

9. The method of claim 8, wherein said component is configured as an aircraft landing system brake disc.

10. The method of claim 8, wherein said phosphorus-containing antioxidant undercoating is formed from a penetrant salt solution containing from 5–80 wt % $H_2O$, 10–70 wt % $H_3PO_4$, up to 25 wt % alkali metal mono-, di-, or tri-basic phosphate, up to 2 wt % $B_2O_3$, and at least one of $MnHPO_4 \cdot 1.6H_2O$, $AlPO_4$, and $Zn_3(PO_4)_2$, in weight-percentages up to 25 wt-%, 30 wt-%, and 10 wt-%, respectively.

11. The method of claim 8, wherein in step (b) the undercoating is annealed to the carbon composite at a temperature in the range of 250–900° C.

12. The method of claim 8, wherein in step (c) the glass overcoating is dried onto the undercoating at ambient temperature for at least one hour.

* * * * *